US010690830B2

(12) United States Patent
Takagi (10) Patent No.: US 10,690,830 B2
(45) Date of Patent: Jun. 23, 2020

(54) LIGHT GUIDE, DISPLAY DEVICE, AND GAME MACHINE

(71) Applicant: Omron Corporation, Kyoto (JP)

(72) Inventor: Yoshihiko Takagi, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/487,597

(22) PCT Filed: Nov. 20, 2017

(86) PCT No.: PCT/JP2017/041688
§ 371 (c)(1),
(2) Date: Aug. 21, 2019

(87) PCT Pub. No.: WO2018/168079
PCT Pub. Date: Sep. 20, 2018

(65) Prior Publication Data
US 2020/0029407 A1 Jan. 23, 2020

(30) Foreign Application Priority Data
Mar. 14, 2017 (JP) .................................. 2017-048875

(51) Int. Cl.
*F21V 8/00* (2006.01)
*H05B 47/10* (2020.01)

(52) U.S. Cl.
CPC .......... *G02B 6/0028* (2013.01); *G02B 6/006* (2013.01); *F21V 2200/13* (2015.01);
(Continued)

(58) Field of Classification Search
CPC ... G02B 6/0028; G02B 6/006; F21V 2200/15; F21V 2200/13; F21V 2200/20; G09G 2310/08; H05B 47/10
See application file for complete search history.

(56) References Cited

U.S. PATENT DOCUMENTS 5,752,881 A * 5/1998 Inoue .................. G07F 17/3211
273/143 R
2002/0024555 A1* 2/2002 Fujioka .................. B41J 2/2132
347/41
(Continued)

FOREIGN PATENT DOCUMENTS

JP 2012088489 A 5/2012
JP 2012-195116 A 10/2012
(Continued)

OTHER PUBLICATIONS

International Search Report issued in PCT/JP2017/041688 dated Jan. 23, 2018 (1 page).
(Continued)

*Primary Examiner* — Raymond R Chai (57) ABSTRACT

A light guide guides incident light rays and emits some of the incident light rays from a light exit surface. The light guide includes a plurality of light exit areas arranged adjacent to one another and configured to change directions of the incident light rays and emit the incident light rays from the light exit surface. Each of the light exit areas includes a plurality of light exit parts in which directions of light rays with maximum intensities out of light rays to be emitted are substantially the same. The light exit parts in each of the light exit areas are configured so that the directions of the light rays with the maximum intensities out of the light rays to be emitted from each of the light exit areas are random. Each of the light exit areas has a strip shape, and lengths of the light exit areas are random.

19 Claims, 4 Drawing Sheets

(52) U.S. Cl.
CPC ....... *F21V 2200/15* (2015.01); *F21V 2200/20* (2015.01); *G09G 2310/08* (2013.01); *H05B 47/10* (2020.01)

(56) References Cited

U.S. PATENT DOCUMENTS

| | | | | |
|---|---|---|---|---|
| 2005/0043083 | A1* | 2/2005 | Inoue | G07F 17/32 463/20 |
| 2005/0277460 | A1* | 12/2005 | Inoue | G07F 17/3211 463/20 |
| 2009/0096965 | A1* | 4/2009 | Nagata | G02F 1/133305 349/103 |
| 2013/0252709 | A1* | 9/2013 | Lee | G02F 1/133615 463/20 |
| 2013/0265802 | A1* | 10/2013 | Kamikatano | G09F 13/18 362/607 |
| 2013/0335945 | A1* | 12/2013 | Okuda | G09F 13/18 362/23.06 |
| 2015/0092444 | A1* | 4/2015 | Takagi | G02B 6/006 362/611 |
| 2015/0168627 | A1* | 6/2015 | Takagi | G02B 6/006 362/613 |
| 2017/0285245 | A1* | 10/2017 | Fujita | A63F 7/027 |
| 2018/0182201 | A1* | 6/2018 | Fujita | G02B 6/0016 |

FOREIGN PATENT DOCUMENTS

| | | |
|---|---|---|
| JP | 2015-088489 A | 5/2015 |
| JP | 2015-118128 A | 6/2015 |
| JP | 2016-122171 A | 7/2016 |
| JP | 2017-107048 A | 6/2017 |
| WO | 2013/024812 A1 | 2/2013 |

OTHER PUBLICATIONS

Written Opinion of the International Searching Authority issued in PCT/JP2017/041688 dated Jan. 23, 2018 (8 pages).
International Preliminary Report on Patentability from PCT/JP2017/041688 completed on Sep. 21, 2018 (6 pages).
Office Action issued in Japanese Application No. 2017-048875; Dated May 12, 2020 (5 pages).

* cited by examiner

LIGHT GUIDE, DISPLAY DEVICE, AND GAME MACHINE

TECHNICAL FIELD

The present invention relates to a light guide and a display device.

BACKGROUND ART

Patent Document 1 describes a light guide in which, for the purpose of causing an observer to visually recognize a light emitting area in a stereoscopic manner, an arrangement is made so that the amount of light reaching an observer, who observes a light exit surface, changes continuously depending on a position in the light emitting area.

PRIOR ART DOCUMENT

Patent Document

Patent Document 1: Japanese Unexamined Patent Publication No. 2015-88489 (published on May 7, 2015)

SUMMARY OF THE INVENTION

Problems to be Solved by the Invention

In a display technology such as illumination, a new appearance display technology has been required in order to make the impact on an observer stronger. For example, if the appearance resembling a stainless-steel surface with polishing marks is achieved, it may be conceivably used as the new appearance display technology.

Therefore, an object of the present invention is to provide a light guide for achieving the appearance resembling a stainless-steel surface with polishing marks.

Means for Solving the Problem

In order to solve the above problem, a light guide according to one aspect of the present invention is a light guide that guides incident light rays and emits some of the incident light rays from a light exit surface. The light guide includes a plurality of light exit areas arranged adjacent to one another and configured to change directions of the incident light rays and emit the incident light rays from the light exit surface. Each of the light exit areas includes a plurality of light exit parts in which directions of light rays with maximum intensities out of the light rays to be emitted are substantially the same. The light exit parts in each of the light exit areas are configured so that the directions of the light rays with the maximum intensities out of the light rays to be emitted from each of the light exit areas are random, and each of the light exit areas has a strip shape.

Effect of the Invention

According to one aspect of the present invention, it is possible to achieve the appearance resembling a stainless-steel surface with polishing marks.

MODE FOR CARRYING OUT THE INVENTION

First Embodiment

Hereinafter, a display device 1 according to the first embodiment of the present invention will be specifically described with reference to the drawings.

Figure 1:
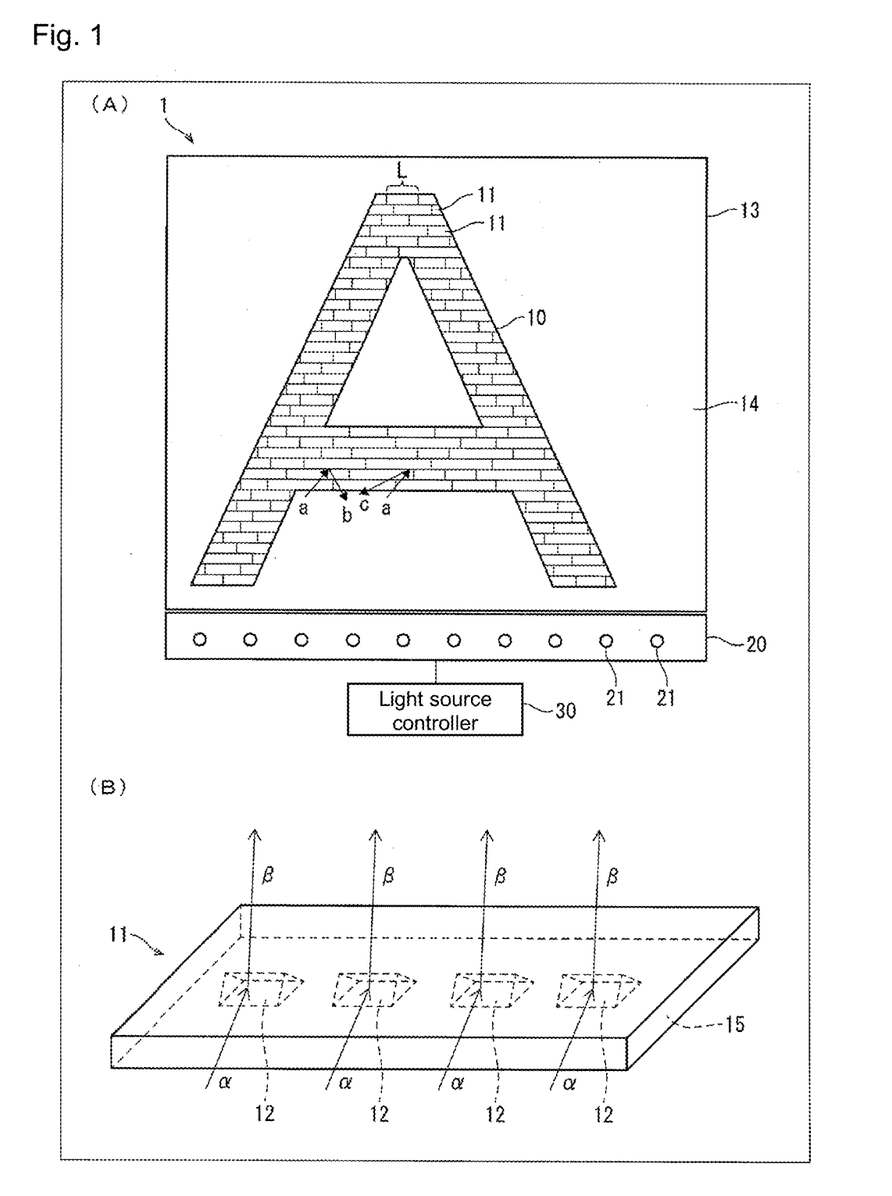
FIGS. 1(A) and 1(b) are views each illustrating a schematic configuration of a display device according to a first embodiment of the present invention.
Figure 2:
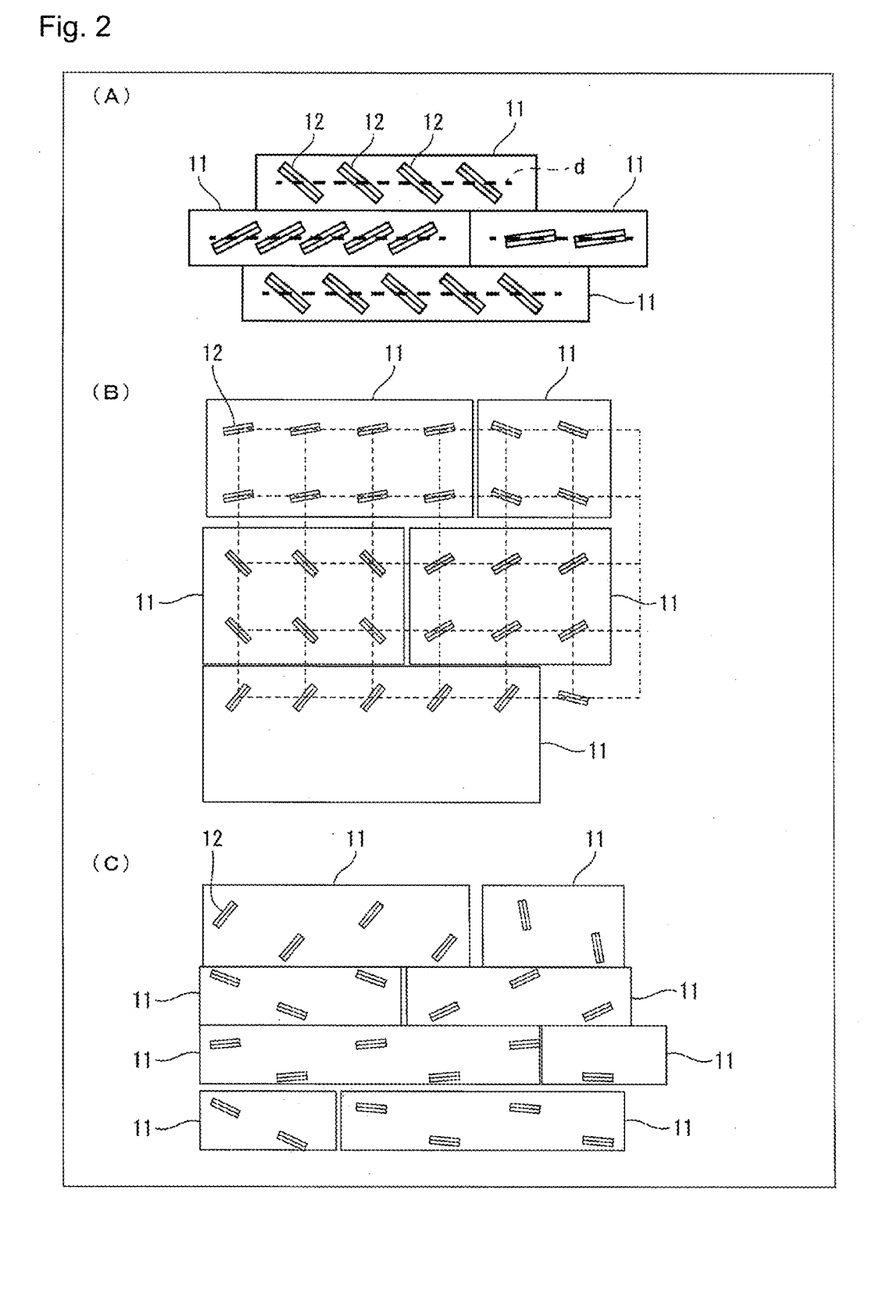
FIGS. 2(A) to 2(C) are top views each illustrating an example of a schematic configuration of light exit areas of the display device according to the first embodiment of the present invention.

FIGS. 1(A) and 1(b) are views each illustrating a schematic configuration of the display device 1 according to the first embodiment of the present invention. FIG. 1(A) is a top view of the display device 1, and FIG. 1(B) is a perspective view of each of light exit areas 11 of the display device 1. FIGS. 2(A) to 2(C) are top views each illustrating an example of a schematic configuration of the light exit areas 11 of the display device 1 according to the first embodiment of the present invention.

The display device 1 according to the first embodiment includes light sources 21, a light guide 13 that guides light rays incident from the light sources 21 and emits some of the light rays from a light exit surface 14, and a light source controller 30 that controls the light emission state of the light source 21.

(Light Guide 13)

As illustrated in FIG. 1(A), in the light guide 13, a plurality of light exit areas 11 are arranged adjacent to one another, the light exit areas 11 for changing the directions of incident light rays and emitting the light rays from the light exit surface 14, to thereby form a specific symbol pattern 10 (here, a letter "A"). In FIG. 1(A), although only two light exit areas 11 are denoted by numerals among the plurality of light exit areas 11, all the white squares illustrated in the symbol pattern 10 represent the light exit areas 11.

The light rays incident into the light guide 13 from the light sources 21 propagate through the light guide 13 while being totally reflected in the light guide 13, and some of the light rays, the directions of which are changed in the light exit area 11, are emitted from the light exit surface 14. Thus, the light rays are emitted from the light exit surface 14 in accordance with the symbol pattern 10 composed of the plurality of light exit areas 11, so that the symbol pattern 10 can be displayed emitting light on the light exit surface 14 of the light guide 13. In the present specification, with reference to the surface on which the light exit areas 11 of the light guide 13 are provided (referred to as "light-exit-area formation surface" for convenience), the surface facing the light-exit-area formation surface is referred to as the "light exit surface." Further, the surface on which the light ray from the light source 21 is incident is referred to as the "light incident surface."

As illustrated in FIG. 1(B), each light exit area 11 is provided with a plurality of light exit parts 12 each having a shape recessed from the light-exit-area formation surface 15 to the inside of the light guide 13. The plurality of light exit parts 12 are configured so that the directions of light rays with the maximum intensities out of light rays to be emitted are the same as the direction of an arrow β. Hence the direction of the light ray (arrow α) incident into the light guide 13 is changed by the light exit part 12 so that the direction of the light ray with the maximum intensity out of the light rays to be emitted is the same as the direction of the arrow β. As a result, from each light exit area 11, the light rays with the maximum intensities aligned to the direction of the arrow β are emitted. Since the light exit area 11 has a strip shape, each light exit area 11 emits a streaky light ray corresponding to the strip shape.

In the plurality of light exit parts 12 provided in each light exit area 11, the directions of the light rays with the maximum intensities out of the light rays to be emitted need not be completely the same. So long as the directions of the light rays with the maximum intensities out of the light rays to be emitted are substantially the same, it is possible to exert an effect similar to that in the case of the directions being completely the same. Here, "the directions of the light rays with the maximum intensities out of the light rays to be emitted are substantially the same" means that the spread of "the directions of the light rays with the maximum intensities out of the light rays to be emitted" is within the range of ±4° among the plurality of light exit parts 12 provided in each light exit area 11. When the spread of "the directions of the light rays with the maximum intensities out of the light rays to be emitted" is within the above range, the light rays are recognized by either the right or left eye of the user, and it can thus be said that the directions of the light rays with the maximum intensities are substantially the same.

Further, as illustrated in FIG. 1(A), the plurality of adjacent light exit areas 11 are configured so that the directions of the light rays with the maximum intensities out of the light rays to be emitted are randomly different. Specifically, in a certain light exit area 11, a plurality of light exit parts are formed so that the directions of the light rays with the maximum intensities out of the light rays to be emitted (arrow a), the light rays incident into the light guide 13, are the same as the direction of the arrow b. In contrast, in the adjacent other light exit area 11, a plurality of light exit parts are formed so that the directions of the light rays with the maximum intensities out of the light rays to be emitted (arrow a), the light rays incident into the light guide 13, are the same as the direction of an arrow c which is different from the direction of the arrow b. As described above, the plurality of light exit areas 11, having mutually different directions of the light rays with the maximum intensities out of the light rays to be emitted, are arranged adjacent to one another to make the emission direction of the light ray to be emitted different for each light exit area 11. It is thereby possible to emit light rays having strong directivities to the respective emission directions. Therefore, the amount of light emitted from each light exit area 11 and reaching an observer who observes the light guide 13 can be made different for each light exit area 11. As a result, the observer who observes the light guide 13 can visually recognize a desired symbol pattern 10 as a display with its appearance resembling a stainless-steel surface with polishing marks.

Figure 3:
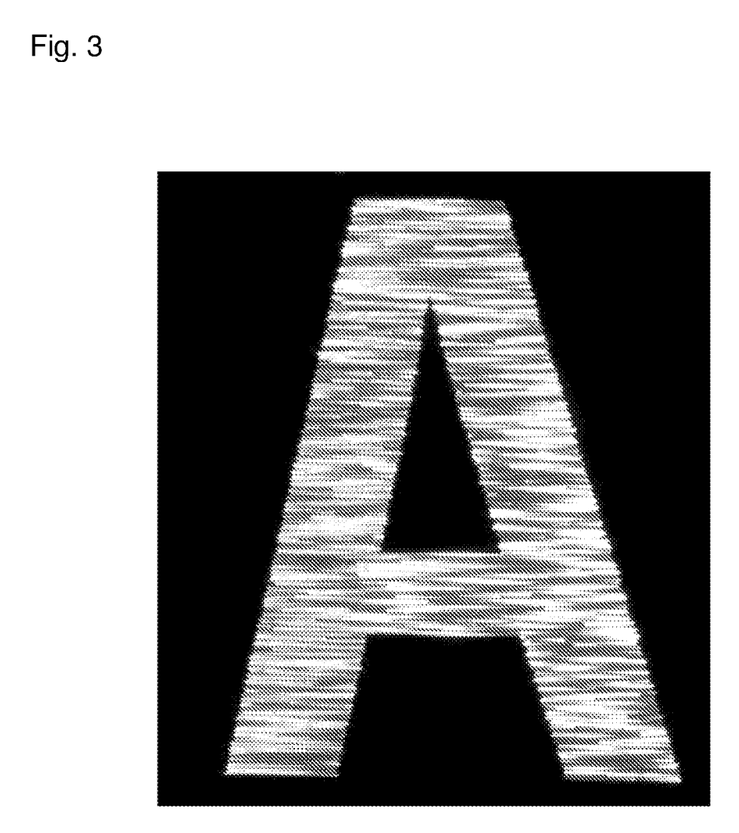
FIG. 3 is a view illustrating an example of a light emission state of a light guide provided in the display device illustrated in FIGS. 1(A) and 1(b).

FIG. 3 is a view illustrating an example of the light emission state of the light guide 13 provided in the display device 1 according to the first embodiment. The example illustrated in this figure shows a light emission state in a case where a plurality of strip-shaped light exit areas 11 are arranged adjacent to one another in a direction along the horizontal direction determined by the installation of the light guide to form the symbol pattern 10 (here, the letter "A"). As described above, in the display device 1 according to the first embodiment, the direction of the light ray with the maximum intensity out of the light rays to be emitted is randomly different for each of the light exit areas 11. Thus, when the observer views the light exit surface in a specific direction, a display with its appearance resembling a stainless-steel surface with polishing marks is achieved.

A length L of the strip-shaped light exit area 11 illustrated in FIG. 1(A) is not particularly limited but is preferably 5 mm to 50 mm. Since the length of the light exit area 11 corresponds to the length of the streaky light ray to be emitted, when the length of the light exit area 11 is in the above range, the sense of horizontal streaks of the polishing marks on stainless steel increases. It is thus possible to achieve a display closer in appearance to polishing marks on stainless steel.

Moreover, the lengths of the plurality of adjacent light exit areas 11 are preferably random. Since the lengths of the plurality of adjacent light exit areas 11 are randomly different, it is possible to emit streaky light rays with randomly different lengths. As a result, it is possible to achieve a display closer in appearance to polishing marks on stainless steel.

In the first embodiment, the example has been illustrated where the strip-shaped light exit area 11 is linear. In this case, it is possible to achieve a display closer in appearance to the horizontal streaks of the polishing marks on stainless steel. Here, as illustrated in FIG. 2(A), when a line bisecting the light exit area 11 in the width direction (a broken line d in the figure) is linear, it can be said that the light exit area 11 is linear. Not all the plurality of strip-shaped light exit areas 11 need to be linear, but at least some may be linear. When at least some of the plurality of strip-shaped light exit areas 11 are linear, the horizontal streaks of the polishing marks on stainless steel increase, so that it is possible to achieve a display closer in appearance to polishing marks on stainless steel. The strip-shaped light exit area 11 can also be curved. Such an embodiment will be described in a second embodiment described later.

Moreover, the linear light exit area 11 preferably has a long shape along the horizontal direction determined by the installation of the light guide 13. Specifically, as illustrated in FIG. 2(A), the linear light exit area 11 is preferably configured so that a line (the broken line d in the figure) bisecting each light exit area 11 in the width direction extends linearly along the horizontal direction determined by the installation of the light guide. Further, the "horizontal direction determined by the installation of the light guide" refers to a direction approximately perpendicular to the vertical direction of the light guide when the observer observes the installed light guide from the light exit surface side.

The "horizontal direction determined by the installation of the light guide" approximately coincides with the direction of the right and left eyes of the observer. When the linear light exit area 11 has a long shape along the horizontal direction determined by the installation of the light guide 13, the difference in appearance is small between the case of the observer viewing with the left eye and the case of the observer viewing with the right eye, and the possibility that the light emission looks the same is high. Hence the appearance in the case of viewing with both eyes can be made more natural.

Further, at least some plurality of light exit areas 11 out of the linear light exit areas 11 are preferably arranged in parallel. Specifically, as illustrated in FIG. 2(A), in a case where a line (the broken line d in the figure) bisecting a certain light exit area 11 in the width direction is parallel to a line (the broken line d in the figure) bisecting an adjacent light exit area 11, it can be said that the certain light exit area 11 and the adjacent light exit area 11 are arranged in parallel with each other. More preferably, 50% or more of all the light exit areas 11 are arranged in parallel to one another. When 50% or more of all the light exit areas 11 are arranged in parallel to one another, streaky light rays are emitted from the respective light exit areas 11 in parallel to one another, thereby increasing the sense of horizontal streaks. As a result, it is possible to achieve a display closer in appearance to polishing marks on stainless steel.

The pattern arrangement of the plurality of light exit parts 12 provided in each light exit area 11 is not limited to the pattern arrangement illustrated in FIG. 2(A) so long as the directions of the light rays with the maximum intensities out of the light rays to be emitted are substantially the same. For example, as illustrated in FIGS. 2(B) and 2(C), the pattern arrangement of the plurality of light exit parts 12 may be a grid form or may be a staggered form.

In the first embodiment, the recessed light exit part 12 has a shape in which a triangular prism is laid on the light-exit-area formation surface of the light guide 13, and the shape of the cross-section in the direction perpendicular to the longitudinal direction of the triangular prism is approximately an isosceles triangle. The shape of the light exit part 12 is not limited to this but may be a shape in which a triangular prism, with its cross-sectional shape in the direction perpendicular to the longitudinal direction being approximately a right triangle, is laid on the light-exit-area formation surface of the light guide 13. Further, the shape of the light exit part 12 may be a shape in which a rectangular prism, with its cross-sectional shape in the direction perpendicular to the longitudinal direction being a polygonal shape, is laid on the light-exit-area formation surface of the light guide 13. The recessed light exit part 12 may have a shape linearly extending along the light-exit-area formation surface of the light guide 13 or a shape extending in a curvilinear manner.

In the first embodiment, the example has been illustrated where the light exit part 12 changes the direction of the incident light ray by reflection. However, the configuration of the light exit part 12 is not limited to this, but the light exit part 12 may change the direction of the incident light by transmission.

Further, the shapes of the plurality of light exit parts 12 provided in each light exit area 11 may be the same or different so long as the directions of the light rays with the maximum intensities are substantially the same, out of the light rays to be emitted by the plurality of light exit parts 12.

The length of the light exit part 12 (the length of the triangular prism) is not particularly limited. The plurality of light exit parts 12 may have different lengths or may have the same length so long as the directions of the light rays with the maximum intensities are substantially the same, out of the light rays to be emitted by the light exit parts 12.

The light exit part 12 is not limited to the shape recessed inward from the side surface of the light guide 13 but may be formed to protrude outward from the side surface of the light guide 13. Further, the light exit part 12 is not limited to the configuration provided integrally with the light guide 13, but for example, an optical member that can change the light direction (e.g., a resin material or the like having a refractive index different from that of the light guide 13) may be embedded on the side surface of the light guide 13.

It is also possible to change the density of the light exit parts 12 provided for each light exit area 11 with the directivity different for each light exit area 11. This makes it possible to create a new appearance that resembles stainless steel and in which the brightness in the peak direction differs from area to area.

In the first embodiment, the light guide 13 is a plate having a rectangular planar shape, but the shape of the light guide 13 is not limited to this. For example, the plane shape may be another polygon or may be another figure such as a circle. The light guide 13 is formed of a transparent material having a relatively high refractive index. As such a material, for example, polycarbonate resin (PC), polymethyl methacrylate resin (PMMA), an acrylic resin, glass, or the like can be used.

(Light Source 21)

In the first embodiment, the light source 21 is disposed at the end face of the light guide 13, and the light ray emitted from the light source 21 is incident into the light guide 13 from the end face of the light guide 13.

As illustrated in FIG. 1(A), the plurality of light sources 21 are provided to constitute a light source group 20. The plurality of light sources 21 are preferably disposed along the longitudinal direction of the light exit area 11. This leads to an increase in the sense of horizontal streaks of the polishing marks on stainless steel, thereby enabling achievement of a display closer in appearance to polishing marks on stainless steel.

Further, the light sources 21 may be configured so that the light exit area 11 as a target to be irradiated with a light ray (a light irradiation target) is different for each light source 21. In this case, as each light source 21, for example, a light source that emits a light ray having directivity, such as a light emitting diode (LED), can be used. In this case, the direction of the optical axis of the emitted light ray may be different for each light source 21. It is thereby possible to efficiently emit a light ray in an appropriate direction of the optical axis to the light exit area 11 as the target to be irradiated with a light ray.

When a plurality of light sources 21 are provided, light rays may be emitted to a plurality of light exit areas 11 by each light source 21. In addition, the light sources 21 may be provided so as to be equal in number to the light exit areas 11, and each of the light sources 21 may emit light rays only to one of the mutually different light exit areas 11.

The light source 21 is not particularly limited, and in addition to the LED, for example, a laser diode or the like can be used.

In the first embodiment, the configuration in which a plurality of light sources 21 are provided has been described, but the number of light sources 21 is not particularly limited. It is also possible to provide one light source 21.

(Light Source Controller 30)

The display device 1 includes the plurality of light sources 21 and the light source controller 30 that controls the light emission state of each light source. The light source controller 30 includes a timing controller (not illustrated) that controls the light exit areas 11 so as to emit light rays at different timings, and a light emission controller (not illustrated) that changes the light emission state of each light exit area 11. The light emission state of each light exit area 11 can be changed by the light emission controller switching the light emission state of the plurality of light sources 21 by on/off, for example. Further, for example, the timing controller may control the plurality of light sources 21 illustrated in FIG. 1(A) so as to emit light rays at different timings from right to left in the drawing plane to give an impression as if an image drawn by the display device is racing or moving.

Second Embodiment

Hereinafter, a display device 100 according to a second embodiment of the present invention will be specifically described with reference to the drawings.

Figure 4:
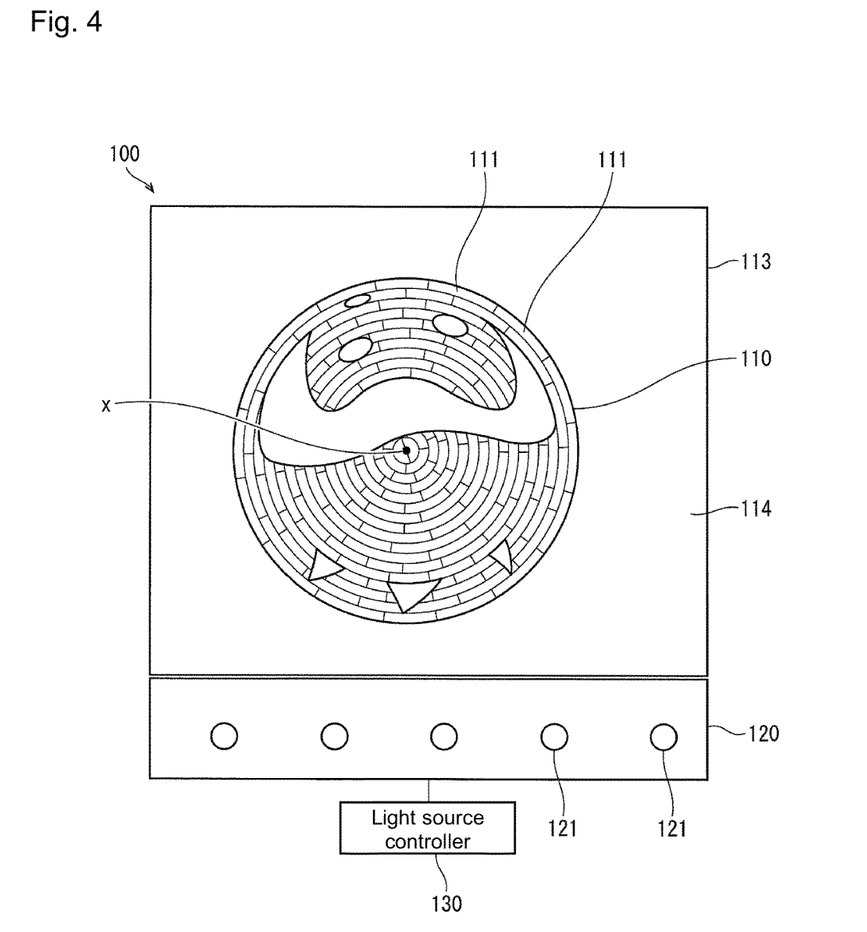
FIG. 4 is a view illustrating a schematic configuration of a display device according to a second embodiment of the present invention.

FIG. 4 is a top view illustrating a schematic configuration of the display device 100 according to the second embodiment of the present invention.

The display device 100 according to the second embodiment is provided with a light source 121, a light guide 113 that guides a light ray incident from the light sources 121 and emits some of light rays from the light exit surface 114, and a light source controller 130 that controls the light emission state of the light source 121. The light source controller 130 has the same function as that of the light source controller 30 described in the first embodiment, and thus the description thereof is omitted.

(Light Guide 113)

As illustrated in FIG. 4, in the light guide 113 of the second embodiment, a plurality of light exit areas 111 are arranged adjacent to one another, the light exit areas 111 for changing the directions of incident light rays and emitting the light rays from the light exit surface 114, to thereby form a specific symbol pattern 110 (here, a circle). In the second embodiment, an example is illustrated where the strip-shaped light exit area 111 is curved, and in particular, the strip-shaped light exit area 111 has an arc shape. In the arc-shaped light exit area 111, a plurality of light exit parts (not illustrated) are formed each having a shape recessed from the light-exit-area formation surface (not illustrated) to the inside of the light guide 113. The plurality of light exit parts are configured so that the directions of light rays with the maximum intensities out of light rays to be emitted are substantially the same. As a result, from each light exit area 111, the light rays with the maximum intensities aligned in the same direction are emitted. Since the light exit area 111 has an arc-like strip shape, each light exit area 11 emits arc-shaped light corresponding to the arc-like strip shape. Note that the description of the light exit part in the first embodiment can be applied to the description of the light emitting portion.

The plurality of adjacent arc-shaped light exit areas 111 are preferably configured so that the directions of the light rays with the maximum intensities out of the light rays to be emitted are randomly different. Hence the amount of light emitted from each light exit area 111 and reaching an observer who observes the light guide 113 can be made different for each light exit area 111. As a result, the observer who observes the light guide 113 can visually recognize a desired symbol pattern 110 as a display with its appearance resembling a stainless-steel surface with polishing marks. Further, in the second embodiment, since the light exit area 111 has an arc-like strip shape, it is possible to achieve a display having a more stereoscopic effect as compared with the display device 1 of the first embodiment.

At least some plurality of light exit areas 111 among the light exit areas 111 each having the arc-like strip shape may be arranged so as to be on an arc of a concentric circle centered at a point x in the figure. In FIG. 4, the point x is set at the center of the symbol pattern 110, but the setting is not limited to this. The position of the point x can be set as appropriate. For example, the position of the point x may be set at a position shifted from the center of the symbol pattern 110. It is thereby possible to achieve a display closer in appearance to polishing marks on stainless steel.

Third Embodiment

A third embodiment of the present invention will be described below. A game machine according to the present embodiment includes the display device 1 according to the first embodiment or the display device 100 according to the second embodiment.

The game machine has a configuration to output an image from the display device 1 or the display device 100 in accordance with the progress of a game. In addition, the display device 1 or the display device 100 is preferably disposed in the game machine so that the display device 1 or the display device 100 is positioned in front of the user's eyes when the user operates the game machine. The game machine is not particularly limited in its type but may, for example, be a pachinko machine or a slot machine. At this time, the game machine can provide the user with a display with the appearance resembling a stainless-steel surface with polishing marks while outputting an image from the display device 1 or the display device 100 in accordance with the progress of the game.

SUMMARY

As described above, a light guide according to one aspect of the present invention is a light guide that guides incident light rays and emits some of the incident light rays from a light exit surface. The light guide includes a plurality of light exit areas arranged adjacent to one another and configured to change directions of the incident light rays and emit the incident light rays from the light exit surface. Each of the light exit areas includes a plurality of light exit parts in which directions of light rays with maximum intensities out of light rays to be emitted are substantially the same. The light exit parts in each of the light exit areas are configured so that the directions of the light rays with the maximum intensities out of the light rays to be emitted from each of the light exit areas are random, and each of the light exit areas has a strip shape.

According to the above configuration, it is possible to achieve a display with its appearance resembling a stainless-steel surface with polishing marks.

In the light guide according to one aspect of the present invention, the lengths of the light exit areas may be random.

According to the above configuration, it is possible to achieve a display closer in appearance to polishing marks on stainless steel.

In the light guide according to one aspect of the present invention, the light exit area may be linear or curved.

According to the above configuration, when the light exit area is linear, it is possible to achieve a display closer in appearance to polishing marks on stainless steel. In addition, when the light exit area is curved, it is possible to achieve a display having a stereoscopic effect.

In the light guide according to one aspect of the present invention, at least some of the light exit areas may have linear strip shapes, and the linear strip shapes may be long shapes along a horizontal direction determined by installation of the light guide.

According to the above configuration, it is possible to achieve a display having a more natural appearance when viewed with both eyes.

In the light guide according to one aspect of the present invention, at least some of the light exit areas may have linear strip shapes, and among the linear strip shapes, at least some plurality of light exit areas may be arranged in parallel.

According to the above configuration, the sense of horizontal streaks of the polishing marks on stainless steel increases, and it is thus possible to achieve a display closer in appearance to polishing marks on stainless steel.

In the light guide according to one aspect of the present invention, at least some of the light exit areas may have arc-like strip shapes, and among the arc-like strip shapes, at least some plurality of light exit areas may be arranged so as to be on an arc of a concentric circle.

According to the above configuration, it is possible to achieve a display having a more stereoscopic effect.

A display device according to one aspect of the present invention includes any one of the light guides described above; and a light source configured to irradiate the light guide with a light ray.

According to the above configuration, it is possible to achieve a display with its appearance resembling a stainless-steel surface with polishing marks.

The display device according to one aspect of the present invention may include a plurality of the light sources, and a target light exit area out of the light exit areas to be irradiated with light rays may be different for each of the light sources.

According to the above configuration, it is possible to achieve a display with its appearance resembling a stainless-steel surface with polishing marks. In addition, when each light guide area emits different light, a completely new appearance can be obtained.

In the display device according to one aspect of the present invention, the light sources may be provided so as to be equal in number to the light exit areas, and the light sources may irradiate the mutually different light exit areas with light rays.

According to the above configuration, it is possible to achieve a display with its appearance resembling a stainless-steel surface with polishing marks. In addition, when each light guide area emits different light, a completely new appearance can be obtained.

The display device according to one aspect of the present invention may include a timing controller configured to control the plurality of the light sources so that timings for irradiating the light exit areas with light rays are different.

According to the above configuration, an image drawn by the display device can give an impression as if the image is racing or moving.

In the display device according to one aspect of the present invention, at least some plurality of the light exit areas may have linear strip shapes, at least some plurality of light exit areas may be arranged in parallel among the linear strip shapes, the display device may include the plurality of light sources configured to irradiate the plurality of linear light exit areas with light rays, respectively, and the plurality of light sources may be arranged in a direction parallel to the linear strip shapes.

According to the above configuration, since the light sources are arranged in parallel with the linear strip shapes, it is possible to efficiently irradiate the light exit areas with light rays.

A game machine according to one aspect of the present invention includes the display device according to one aspect of the present invention, and the display device performs display in accordance with progress of a game.

According to the above configuration, an effect similar to that of the display device according to one aspect of the present invention is exerted.

The present invention is not limited to each of the embodiments described above but can be subjected to a variety of changes in the scope illustrated in the claims. An embodiment obtained by appropriately combining technical means disclosed respectively in different embodiments is also included in a technical scope of the present invention.

DESCRIPTION OF SYMBOLS 1 display device
10 symbol pattern
11 light exit area
12 light exit part
13 light guide
14 light exit surface
15 light-exit-area formation surface
20 light source group
21 light source
30 light source controller
100 display device
110 symbol pattern
111 light exit area
113 light guide
114 light exit surface
121 light source
130 light source controller

The invention claimed is:

1. A light guide that guides incident light rays and emits some of the incident light rays from a light exit surface, the light guide comprising
a plurality of light exit areas arranged adjacent to one another and configured to change directions of the incident light rays and emit the incident light rays from the light exit surface,
wherein
each of the light exit areas includes a plurality of light exit parts in which directions of light rays with maximum intensities out of light rays to be emitted are substantially the same,
the light exit parts in each of the light exit areas are configured so that the directions of the light rays with the maximum intensities out of the light rays to be emitted from each of the light exit areas are random, and
each of the light exit areas has a strip shape, and lengths of the light exit areas are random.

2. The light guide according to claim 1, wherein the light exit area is linear or curved.

3. The light guide according to claim 2, wherein at least some of the light exit areas have linear strip shapes, and the linear strip shapes are long shapes along a horizontal direction determined by installation of the light guide.

4. The light guide according to claim 3, wherein at least some of the light exit areas have linear strip shapes, and among the linear strip shapes, at least some plurality of light exit areas are arranged in parallel.

5. The light guide according to claim 2, wherein at least some of the light exit areas have linear strip shapes, and among the linear strip shapes, at least some plurality of light exit areas are arranged in parallel.

6. The light guide according to claim 5, wherein 50% or more of all the total light exit areas are arranged in parallel to one another.

7. The light guide according to claim 2, wherein at least some of the light exit areas have arc-like strip shapes, and among the arc-like strip shapes, at least some plurality of light exit areas are arranged so as to be on an arc of a concentric circle.

8. A display device comprising:
the light guide according to claim 1; and a light source configured to irradiate the light guide with a light ray.

9. The display device according to claim 8, comprising a plurality of the light sources,
wherein a target light exit area out of the light exit areas to be irradiated with light rays is different for each of the light sources.

10. The display device according to claim 9, wherein
at least some plurality of the light exit areas have linear strip shapes,
among the linear strip shapes, at least some plurality of light exit areas are arranged in parallel,
the display device comprises the plurality of light sources configured to irradiate the plurality of linear light exit areas with light rays, respectively, and
the plurality of light sources are arranged in a direction parallel to the linear strip shapes.

11. The display device according to claim 9, wherein
the light sources are provided so as to be equal in number to the light exit areas, and
the light sources irradiate the mutually different light exit areas with light rays.

12. The display device according to claim 11, comprising
a timing controller configured to control the plurality of the light sources so that timings for irradiating the light exit areas with light rays are different.

13. The display device according to claim 11, wherein
at least some plurality of the light exit areas have linear strip shapes,
among the linear strip shapes, at least some plurality of light exit areas are arranged in parallel,
the display device comprises the plurality of light sources configured to irradiate the plurality of linear light exit areas with light rays, respectively, and
the plurality of light sources are arranged in a direction parallel to the linear strip shapes.

14. The display device according to claim 9, comprising
a timing controller configured to control the plurality of the light sources so that timings for irradiating the light exit areas with light rays are different.

15. The display device according to claim 14, wherein
at least some plurality of the light exit areas have linear strip shapes,
among the linear strip shapes, at least some plurality of light exit areas are arranged in parallel,
the display device comprises the plurality of light sources configured to irradiate the plurality of linear light exit areas with light rays, respectively, and
the plurality of light sources are arranged in a direction parallel to the linear strip shapes.

16. The display device according to claim 8, wherein
at least some plurality of the light exit areas have linear strip shapes,
among the linear strip shapes, at least some plurality of light exit areas are arranged in parallel,
the display device comprises the plurality of light sources configured to irradiate the plurality of linear light exit areas with light rays, respectively, and
the plurality of light sources are arranged in a direction parallel to the linear strip shapes.

17. A game machine comprising
the display device according to claim 8,
wherein the display device performs display in accordance with progress of a game.

18. The light guide according to claim 1, wherein a spread of "the directions of the light rays with the maximum intensities out of the light rays to be emitted" is within a range of ±4° among the plurality of light exit parts provided in the light exit area.

19. The light guide according to claim 1, wherein a length of the strip-shaped light exit area is 5 mm to 50 mm.

* * * * *